United States Patent [19]

Buet et al.

[11] Patent Number: 5,147,981
[45] Date of Patent: Sep. 15, 1992

[54] LOW VOLTAGE ELECTRICAL SWITCHGEAR CABINET

[75] Inventors: Jacques Buet; Robert Chambron, both of St. Pierre D'Albigny; Jean-Marc Bonnet, Barberaz; Emile Grosset-Janin, Montmelian, all of France

[73] Assignee: Merlin Gerin, Meylan, France

[21] Appl. No.: 718,789

[22] Filed: Jun. 21, 1991

[30] Foreign Application Priority Data

Jul. 2, 1990 [FR] France .............................. 90 08442

[51] Int. Cl.⁵ .............................................. H05K 5/00
[52] U.S. Cl. ..................................... 174/52.1; 200/303; 220/4.02; 220/265.2; 312/223; 361/357; 361/390; 361/428
[58] Field of Search ................. 206/328, 334; 220/3.2, 220/3.94, 4.02, 265.1, 265.2, 265.5; 312/108, 223; 174/52.1, 92; 200/50 R, 50 A, 293, 302.1, 303; 361/331, 332, 334, 335, 356, 357, 358, 390, 381, 425, 426, 427, 428, 429, 417, 419, 420

[56] References Cited

U.S. PATENT DOCUMENTS

| | | | |
|---|---|---|---|
| 3,743,892 | 7/1973 | Fritz | 174/67 |
| 4,204,245 | 5/1980 | Luke | 361/358 |
| 4,517,623 | 5/1985 | Barner | 361/358 |
| 4,652,969 | 3/1987 | Stezenga | 361/384 |
| 4,862,324 | 8/1989 | Kulvaitis | 361/390 |

FOREIGN PATENT DOCUMENTS

| | | |
|---|---|---|
| 0351279 | 1/1990 | European Pat. Off. . |
| 2579839 | 10/1986 | France . |
| 2175456 | 11/1986 | United Kingdom . |

*Primary Examiner*—Gerald P. Tolin
*Attorney, Agent, or Firm*—Parkhurst, Wendel & Rossi

[57] ABSTRACT

An electrical switchgear cabinet comprises a frame, formed by uprights and switchgear support rails, which is fixed to props securedly united to a back plate. The sides of the back plate are folded forwards over a limited height smaller than the distance between the rails and the back plate, so as to define with the ends of these rails, trunkings for the cables to run facilitating connection to the switchgear. The back plate bears two blanking plates which extend over the whole width of the cabinet and an enclosure can be fitted on the sides to cover the frame and the switchgear supported by this frame. The props serve the purpose of fixing the uprights and enclosure and comprise lateral flanges enabling the back plate to be fixed to the wall. These lateral flanges comprise a guide for the bit for drilling the holes in the wall and a device to make up for drilling deviations.

9 Claims, 4 Drawing Sheets

LOW VOLTAGE ELECTRICAL SWITCHGEAR CABINET

BACKGROUND OF THE INVENTION

The invention relates to a parallelipipedic cabinet for housing, electrical switchgear, comprising a metal back plate having two side faces are folded forward into a bracket, an H-shaped frame with profiled transverse rails for fixing the switchgear and uprights on which the rails are fixed, these uprights being themselves fixed to the back plate, an enclosure in the form of a rectangular frame of the same size as the back plate and secured by screws to the back plate to surround the frame, a front plate blanking off the front face of the enclosure opposite the back plate of the cabinet, the front plate having an aperture for the front part of the switchgear with the operating handle to pass through and at least one blanking plate inserted between the enclosure and back plate to blank off the top and/or bottom panel of the cabinet.

The use of standard electrical cabinets is more and more frequent, and it is important to facilitate fixing of the cabinet and fitting of the switchgear inside the cabinet with its connections to the incoming and outgoing cables. In monoblock cabinets, it is difficult to run the cables inside the cabinet and connect them to the terminals which are difficult to access. State-of-the-art cabinets comprise a back plate supporting rails onto which the switchgear is clipped so that the switchgear can be fitted and the cables connected before a cover is fitted to the assembly. This fitting can be hindered by badly fitted or secured cables, and positioning of the cover gives rise to serious problems.

The object of the invention is to achieve an electrical switchgear cabinet which makes the fitter's job easier while preserving standardization and low manufacturing costs.

SUMMARY OF THE INVENTION

The cabinet according to the invention is characterized in that the front edge of the blanking plate in the assembled position protrudes out from the front edges of the two folded sides and is flush with or protrudes frontwards from the plane containing the profiled rails, that the length of the profiled rails is greater than the distance between the uprights and is smaller than the distance between the two folded sides to provide a trunking between the ends of the profiled rails and these sides to run the cables, and that the front edge of the folded sides is set back from the plane containing the profiled rails.

The folded sides of the back plate hold the cables laterally, the latter being fitted in the cabinet via the blanking plate or plates, located on the top and/or bottom panel of the cabinet. By limiting the height of the side edges, this height being smaller than the distance between the back plate and the profiled rail, the cables can be slid behind the rail via the trunking bounded by the ends of the sides and of the profiled rail. The inserted cables are held by the folded sides and by the laterally protruding parts of the rails. The edges of the sides are folded inwards to avoid any cutting edge that might injure the fitter when he fits the cables in the cabinet, these edges being shaped as a centering and guiding dihedron of the enclosure fitting onto the back plate. The corresponding edge of the enclosure is shaped as a conjugate dihedron, preferably concave to prevent any foreign bodies, notably wires, from getting into the sensitive space of the cabinet. The dihedron shapes also facilitate fitting of a seal inserted between the dovetailed faces.

The blanking plate extends over the whole width of the cabinet and its front edge protrudes out from the folded sides to provide a maximum space for insertion of the cables. This plate made of insulating plastic material prevents any damage to the cables, and it advantageously has press-out or precut parts for the cables to pass through.

According to an important development of the invention, four props are fixed to the back plate of the cabinet to perform different functions and firstly fixing of the cabinet to the supporting wall. To achieve this each prop comprises a side flange laid flat against the back plate and bearing a collar of large diameter, forming a partially closed housing capable of receiving a circular insert having an oblong diametrical orifice. The back plate is perforated opposite the housing to a corresponding diameter for an extension of the collar securedly united to the prop to pass through, constituting both a centering end of the prop and a shim for spacing the back plate with respect to the wall on which it is fixed. By rotating the insert, the oblong insert can be moved to face the fixing hole made in the wall, even in case of slight drilling deviations, and the screw can be fitted via the oblong orifice and the back plate and be screwed into the hole made in the wall. The prop made of molded plastic material comprises systems for clipping onto conjugate parts of the back plate for fixing which can be completed by riveting or any other appropriate means. The four props fixed to the back plate constitute the cabinet fixing parts and they comprise four columns with internal threads into which the enclosure fixing screws are screwed. The ends of the columns are advantageously arranged as centering pins cooperating with conjugate parts of the enclosure with which they fit. The frame is also fixed to the four props which are arranged facing the ends of the four uprights The U-shaped uprights with splayed opening fit onto conjugate blocks of the props to which they are bolted. The uprights are slightly separated from the back plate to provide a cableway between the uprights and the back plate. The four columns advantageously surround the four ends of the uprights and these four columns have one or more inclined faces opposite these ends to facilitate fitting of the frame and its self-centering towards the fixing blocks. The fixing nut is inserted in a corresponding housing of the prop so that it can not be lost, which makes fixing easier. Drilling the hole in the wall is rendered easier by a drilling guide in the form of a hub blanking off the back of the rotary insert housing. This perforated hub, located in the axis of the housing, constitutes a bit guide for ease of drilling. This guide is removed automatically when drilling takes place by the movement of the bit which breaks the weakened parts of the plastic material. The four props are advantageously fitted to the back plate in the plant and the inserts cast with the props are attached to the latter by breakable tongues. The fitter places the back plate flat against the wall and drills the four holes in the wall with a drill, the bit being guided by the guide hub supported by the prop. After this drilling, the insert with oblong orifice merely has to be inserted in the housing from which the guide hub has been removed, and turned to compensate for any slight drilling errors and enable the screw to be fitted.

The front edge of the enclosure has an inwardly inclined front face to form a frame for partial flush-mounting of the door, this inclined face cooperating with the door seal. The inclined face is extended by a bracket offset towards the inside of the cabinet and forming a bearing edge of the front plates covering the switchgear fixed on the rails. The cabinets generally comprise several rails staggered heightwise and each rail has associated with it a front plate letting the front of the switchgear with their operating handles pass through. It is also possible to provide a front plate common to all or some of the fixing rails. The heads of the screws fixing the enclosure to the back plate are accessible from the front and these heads are advantageously covered by a flap or a cache improving the aesthetic look of the cabinet. The rails are fixed to the uprights with spacers and they have a symmetrical profile for. clipping on modular switchgear. Mounting plates for switchboard main switchgear devices or switchgear with non-standard profiles can also be fixed to the uprights The frame and enclosure are described in greater detail in two patent applications filed jointly and respectively entitled: Functional frame for electrical switchgear in a cabinet; and Low voltage cabinet.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
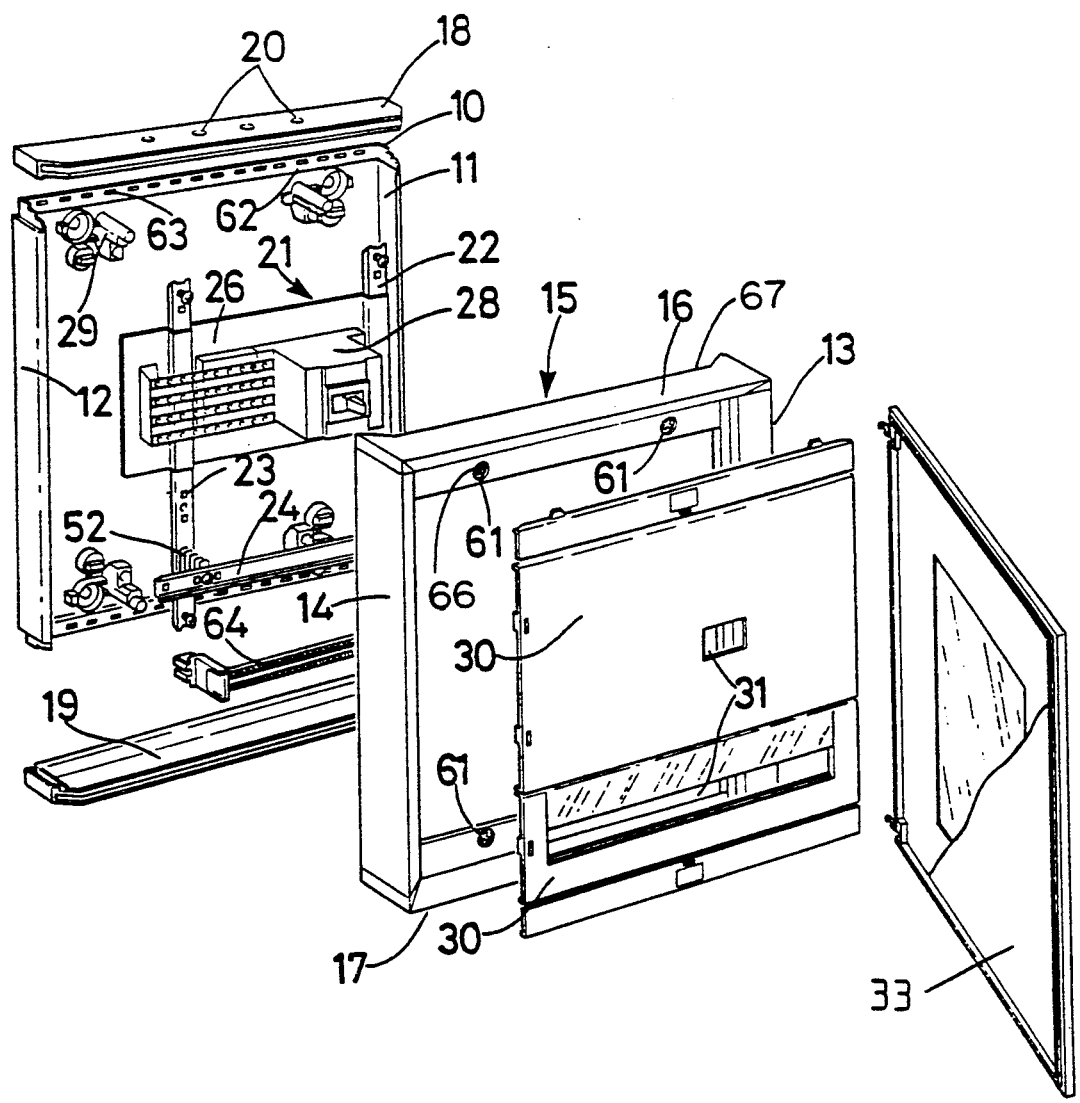
FIG. 1 is an exploded schematic perspective view of a cabinet according to the invention.
Figure 2:
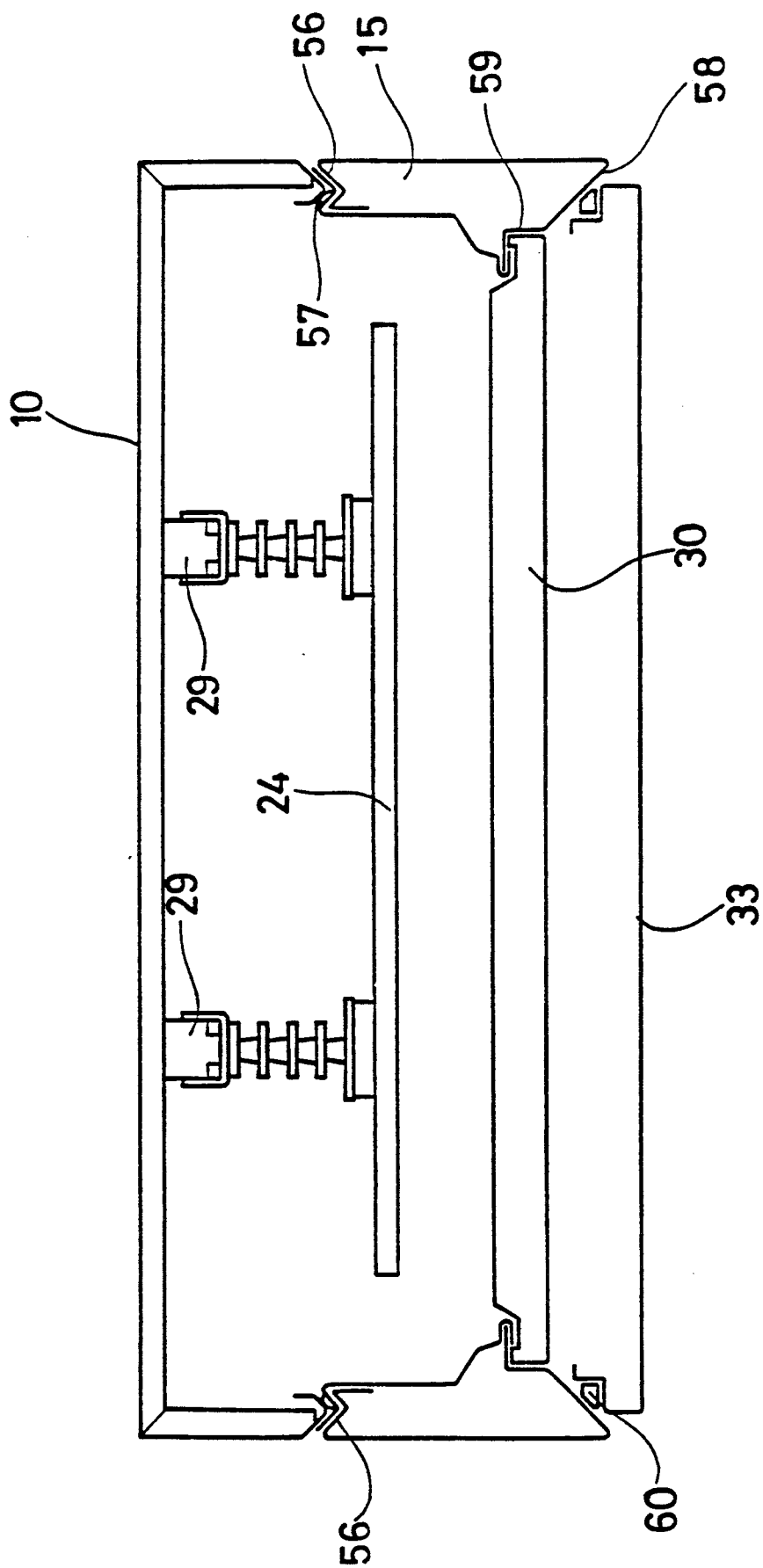
FIG. 2 is a sectional plane view of the cabinet according to FIG. 1.

In the figures, the back plate 10 of an electrical switchgear cabinet is formed by a sheet metal plate designed to be fixed to a wall. The two side plates 11, 12 of the back plate 10 are folded forwards into a bracket to form the two side faces of the cabinet, in cooperation with the two sides 13, 14 of an enclosure 15. The enclosure 15 in the form of a rectangular frame of the same size as the back plate 10 is affixed to the latter, the folded sides 11, 12 being coplanar to the sides 13, 14 of the enclosure 15. The top 16 and bottom 17 faces of the enclosure 15 are provided with recessed portions 67 to define in the assembled position on the back plate 10 openings for the cables to pass through, blanked off by blanking plates 18, 19. The blanking plates 18, 19 have perforations or openings 20, or press-out parts enabling the cables to enter the cabinet. In the volume bounded by the back plate 10, enclosure 15 and blanking plates 18, 19, there is housed a frame 21 formed by two uprights 22, 23 connected by symmetrical sectional rails 24, and a mounting plate 26. Modular electrical switchgear 27 is clipped onto the symmetrical profile rails 24, whereas other switchgear, for example of the molded case type, is fixed to the mounting plate 26. The frame 21 is fixed to the back plate 10 by means of four props 29 supported by the back plate 10 opposite the ends of the uprights 22, 23, which are fixed by screws to these props 29. The front face of the enclosure 15 is blanked off by a front plate 30 in one or more parts having orifices 31 through which the front parts of the switchgear 27, 28 and their manual operating handles 32 pass. The assembly comprises a door 33 forming the front face of the parallelipipedic cabinet. The four props 29 constitute spacers separating the uprights 22, 23 from the back plate 10 to leave at the rear of the uprights 22, 23 a passage for the cables which are not well secured by collars, and these four props 29 are located away from the sides 11, 12 to confine with the latter passages through which the connecting cables can be run to the switchgear 27, 28.

Figure 5:
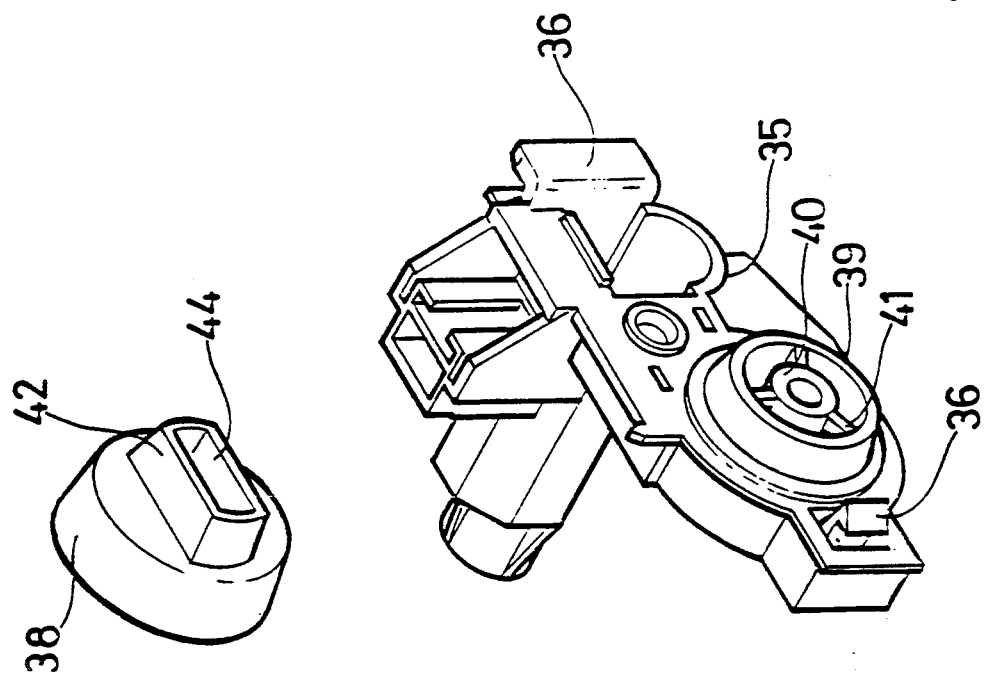
FIG. 5 is a similar view to that of FIG. 4 showing the prop seen from behind.
Figure 4:
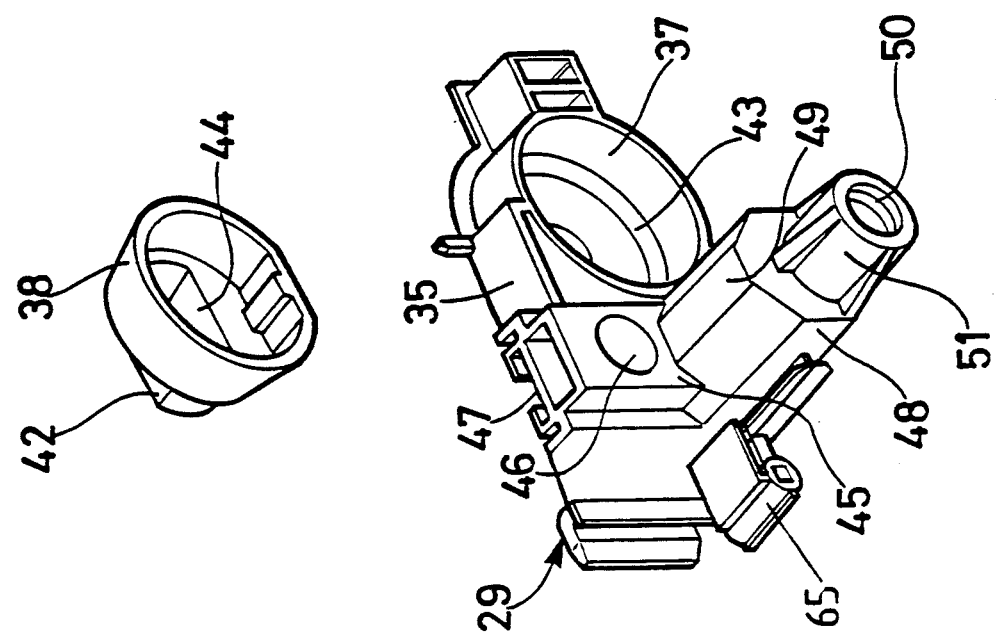
FIG. 4 is a schematic perspective view of a fixing prop according to FIG. 1.

The props 29 are molded insulating parts made of plastic material, symmetrical in twos and represented in detail in FIGS. 4 and 5. Each prop comprises a lateral flange 35 laid flat against the back plate 10 and affixed to the latter by hooks 36 which clip into perforations (not shown) provided in the back plate 10. The flange 35 bears, on the internal side of the cabinet, a cylindrical collar 37 in which a rotating insert 38 can be inserted with small clearance. The opposite face of the lateral flange 35, in contact with the back plate 10, bears, coaxially to the collar 37, a cylindrical shim 39 protruding via an orifice (not shown), of corresponding diameter, provided in the back plate 10. In the center of the cylindrical shim 39 there is located a hub 40 to guide the drilling bit, this hub being attached to the shim by breakable spokes 41. After the breakable spokes 41 have been broken, the internal space of the cylindrical shim 39 is available to accommodate an oblong protrusion 42 supported by the insert 38. When the insert 38 is inserted in the collar 37, the oblong protrusion 42 passes through the cylindrical shim 39 so as to be flush with the latter and come into contact with the wall. The insert 38 is retained by an annular bearing face 43 located at the interface between the collar 37 and the cylindrical shim 39. The oblong protrusion 42 has an oblong slit 44 for the fixing screw securing the back plate to the wall to pass through. The drilling bit is guided by the hub 40 and slight drilling deviations can be made up for by rotation of the insert 38 bringing the oblong slit 44 opposite the drilled hole. The prop 29 and insert 38 can be cast in a single piece, the two parts being attached by a breakable tongue in a manner well-known to those specialized in the art.

The prop 29 bears, on the internal side of the cabinet, a block 45 onto which the U-shaped upright 22, 23 clips. The end of the upright 22, 23 is securely united to the prop 29 by a nut and bolt, the latter passing through an orifice 46 arranged in the rectangular block 45 and ending in a groove 47 housing the nut (not shown). The prop 29 in addition bears a column 48 for fixing the enclosure 15, this column 48 extending in the fitted position of the prop 29 perpendicular to the back plate 10. The column 48 is adjacent to the block 45 and the face 49 on the block 45 side is shaped as a sloping guide wedge of the end of the upright 22, 23 to move and center these uprights, when the frame 21 is fitted on the props 29. A threaded orifice 50 is axially drilled in the end of the column 48 to accommodate a fixing screw of the enclosure 15. The external part 51 of the end of the column 48 is shaped as a centering cone which cooperates with a conjugate part of the enclosure 15 to position the enclosure correctly when it is fitted on the back plate 10. The prop 29 according to the invention performs several functions:

- guiding of the wall drilling bit by the hub 40;
- recovering drilling deviation by limited rotation of the insert 38;
- clearance of the back plate 10 from the wall by the shims 39;
- fixing of a terminal block 64 or any support;
- centering and fixing of the frame 21 by the faces 49 and blocks 45, the uprights 22, 23 being fitted with clearance from the back plate 10;
- centering and fixing of the enclosure 15 on the back plate 10 by the columns 48.

Figure 3:
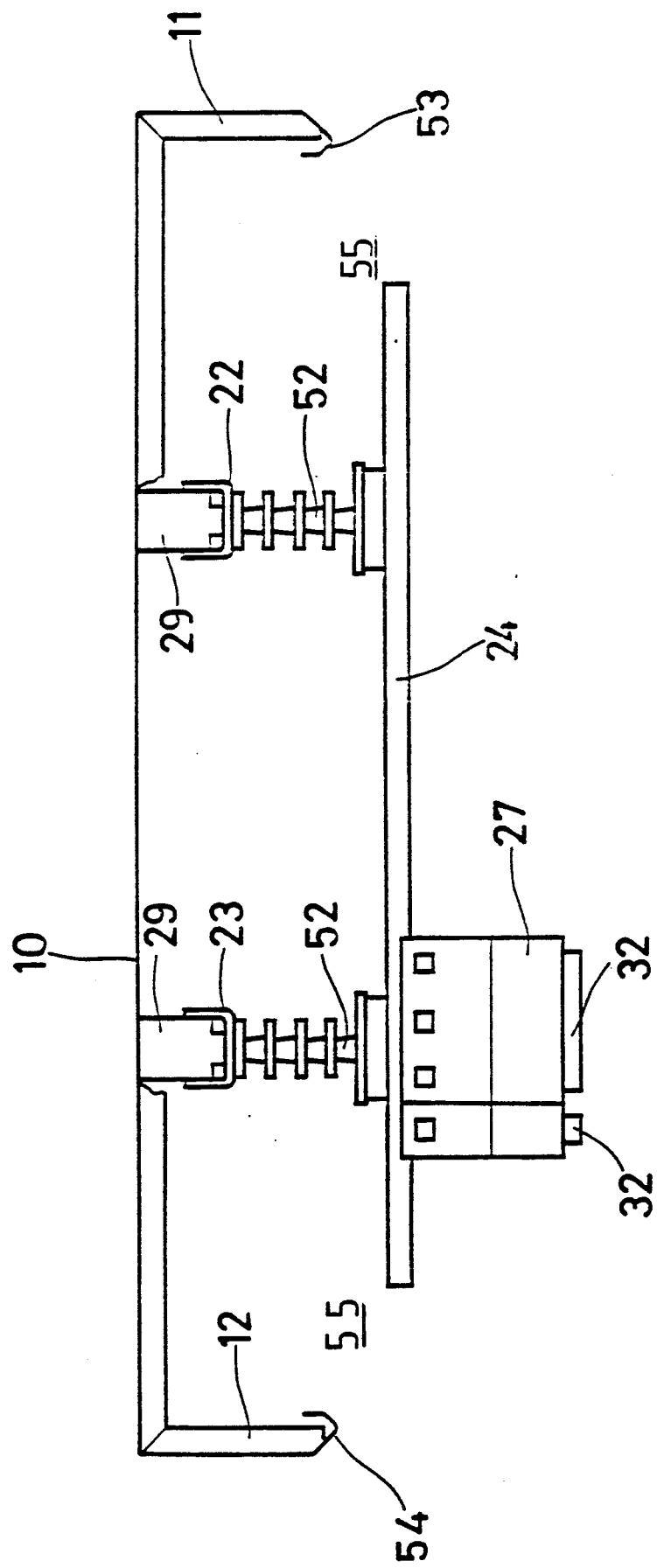
FIG. 3 is a similar view to that of FIG. 2, the enclosure with the front plate and door being assumed to have been removed.

Referring more particularly to FIG. 3, it can be seen that the rails 24 are fixed to the uprights 22, 23 by spacers 52, so that the rails 24 protrude out from the edges 53, 54 of the folded sides 11, 12 of the back plate 10. The length of the rails 24 is smaller than the width of the cabinet, i.e. the distance between the two sides 11, 12, so as to provide trunkings 55 between the ends of the rails 24 and the edges 53, 54 for insertion of the cables. The depthwise offset of the rails 24 with respect to the edges 53, 54 provides trunkings 55 sufficient to accommodate the cables, while preserving an appreciable length of the fixing rails 24. The edges 53, 54 are formed by folds towards the inside of the metal plate 10, so as to constitute a centering dihedron of the enclosure 15, this dihedron providing at the same time a blunt edge preventing any injury to hands when inserting the cables. The enclosure 15 has on its side cooperating with the sides 11, 12, a conjugate shape forming a concave dihedron 56 which fits onto the convex dihedra of the edges 53, 54, when the enclosure 15 is fitted on the back plate 10, thus performing positioning and self-centering. The dihedron shape facilitates fitting of a seal 57 between the enclosure 15 and back plate 10. This seal 57 can be coextruded or be part of an insulating film covering the metal parts, notably the back plate 10. The front edge of the enclosure 15 has an inwardly inclined face 58 with the corners cut off, the door 33 fitting partially inside this frame with inclined face 58. The inclined face 58 extends towards the inside of the cabinet by means of corner-pieces 59 forming a support frame of the front plates 30. The edges of the door 33, also made of sheet metal, are folded inwards to provide a housing for a seal 60 which cooperates in the closed position of the door 33 with the inclined faces 58 to ensure tight sealing and centering of the door 33. The front plates 30 are fixed by any suitable means to the enclosure 15 and the latter is itself fixed to the back plate 10 by screws passing through orifices 61 provided on top and bottom strips of the enclosure 15 and accessible from the front of the cabinet. The orifices 61 and corresponding screws 66 can be hidden after the enclosure 15 has been fixed by flaps or caches improving the aesthetic look of the cabinet. The screws are of the grub type with locking preventing nuisance tightening in the course of transportation.

The top and bottom edges 62 of the back plate 10 form a fold of small height bounding with the part facing the enclosure 15 an opening for the cables to pass through, blanked off by plates 18, 19. On the edges 62 there are provided slits 63 for the cable fixing collars to pass through and the blanking plates are fixed to the back plate 10 by any suitable means, notably by clipping. A terminal block 64 can be fixed parallel to the rails 24 in the vicinity of the top and bottom edges, on an appendix 65 of the props 29, or directly on the back plate 10.

The cabinet is assembled as follows:

The back plate 10 is supplied with the props 29 secured by clipping and riveting if need be. The blanking plates 18, 19 are securedly fitted to the back plate 10, possibly after pressing or drilling out the orifices 20 or cut-outs for the cables to pass. The props 29 mark the limits of a central zone corresponding appreciably to half the width of the back plate 10 and two side zones, each of about a quarter of this width, for the cables which are fixed by collars passing through the slits 63. The back plate 10 constitutes the drilling gauge of the holes for fixing to the wall, the drilling bit being guided by the hub 40. After the holes have been drilled and fixing plugs fitted, the insert 38 merely has to be fitted and the slit 44 correctly positioned to tighten the fixing screws. The shims 39 ensure spacing between the back plate 10 and the wall.

The frame 21 is preferably made up separately by fixing the rails 24 and mounting plate 26 on the uprights 22, 23. The switchgear 27, 28 can be fixed to the frame 21 before or after the latter is fitted on the props 29. This fitting is made easier by the inclined faces 49 and the guide blocks 45 of the props 29. The nuts are fitted beforehand to help fitting of the fixing screws. The fitter does the wiring and connections and introduces the cables laterally via the trunkings 55. This fitting is made easier by the folds of the edges 53, 54 which retain the cables. The switchgear connection terminals are easily accessible and all the connections can be made before the enclosure 15 is fitted. The enclosure 15 is then fitted on the back plate 10, before or after the front plates 30 are fitted, and is secured by the screws passing through the orifices 61 and screwed into the threads 50 of the props 29. The dihedron or chicane shape of the edges 53, 54 and conjugate parts of the enclosure 15 facilitates this fitting and the internal surface of the dihedron enables the seal 57 to take its bearing whereas the external surface is oriented to prevent any solid body, notably a wire, from getting into the cabinet. If the cabinet comprises a door 33, the latter can be mounted on the enclosure 15 before or after it is fitted on the back plate 10. The cut-off corners 58 and semi-flush door enhance the aesthetic look of the cabinet, which is preserved for a cabinet without a door by the absence of any visible screws. The enclosure 15 can easily be disassembled by removing the front plates 30, by simply removing the four fixing screws securing it to the prop 29. After this enclosure 15 has been removed, all the inside of the cabinet is easily accessible to fit new switchgear or modify the wiring. The usual accessories, such as a terminal block for instance, can naturally be fixed to the uprights 22, 23 and/or rails 24. The offset of the frame 21 with respect to the back plate 10 provides a passage for the cables which are not well secured by collars and the blanking plates 18, 19 which extend over the whole width of the back plate 10 provide a maximum space for insertion of the cables.

The invention is naturally in no way limited to the embodiment particularly described herein.

We claim:

1. A parallelipipedic cabinet for housing electrical switchgear having a front part with an operated handle, comprising a top panel, a bottom panel, a metal back plate having two side faces folded forwards into a bracket to present front edges, an H-shaped frame with profiled transverse rails for fixing the switchgear and uprights on which the rails are fixed, said uprights being fixed to said back plate, an enclosure in the form of a rectangular frame of the same size as the back plate and secured by screws to the back plate to surround the frame, said enclosure having a front plate opposite the back plate of the cabinet, and top and bottom plates having recessed portions thereby defining an area between said back plate and said top and bottom plates for cables to pass through, said front plate having an aperture for the front part of the switchgear with the operating handle to pass through and at least one blanking plate inserted between the enclosure and back plate to blank off the top and/or bottom panel of the cabinet, the at least one blanking plate having a front edge which in the assembled position protrudes out from the front edges of the two folded side faces and is flush with or protrudes frontwards from the plane containing the profiled rails, the length of the profiled rails is less than the distance between the two side faces to provide a space in the form of a trunking between the ends of the profiled rails and the two side faces to run the cables, and the front edges of the two side faces are set back from the plane containing the profiled rails.

2. The cabinet according to claim 1, comprising four props securedly united to the back plate and protruding out frontwards therefrom being located with lateral clearance from the folded sides to leave a passage for the cables, said props having bearing and fixing faces of the uprights leaving a clearance for the cables to pass between the uprights and the back plate.

3. The cabinet according to claim 1, wherein the back plate is formed by a metal plate the front edge of whose folded sides has inward folds to form a centering and sealing dihedron on which the edge of the enclosure shaped as a conjugate dihedron dovetails.

4. The cabinet according to claim 2, wherein each prop for fixing the frame to the back plate comprises a lateral flange with a cylindrical collar for a screw fixing the back plate to the wall to pass through, the cross-section of said collar being greater than the cross-section of said screw to receive a rotating insert with an oblong orifice through which the screw passes to make up for drilling deviations.

5. The cabinet according to claim 4, wherein the back plate of said collar is provided with a guide for centering the bit, said guide being breakable to enable the insert to be fitted after drilling.

6. The cabinet according to claim 2, wherein the props for fixing the frame to the back plate are arranged as columns for fixing the enclosure, said columns adjacent to and protruding out from the bearing faces of the uprights having a face for guiding and centering the frame, which facilitates fixing of the frame on the props.

7. The cabinet according to claim 6, wherein the enclosure is secured to the four props by self-locking grub screws which screw into the end of the columns and wherein the heads of these screws, accessible on the front panel, are hidden by flaps or caches fixed to the enclosure.

8. The cabinet according to claim 1, herein the blanking plate or plates are made of plastic material and extend over the whole width of the cabinet and are clipped onto the back plate to enable the cables to pass through and be fitted where the enclosure is removed.

9. The cabinet according to claim 1, wherein the front edge of the enclosure has an inwardly inclined face with dovetails, on which a door of the cabinet has mating dovetails with a seal interposed therebetween, wherein the inclined face is extended by a corner-piece offset towards the inside of the cabinet forming a support frame for the front plate.

* * * * *